US007765299B2

(12) United States Patent
Romero

(10) Patent No.: US 7,765,299 B2
(45) Date of Patent: Jul. 27, 2010

(54) DYNAMIC ADAPTIVE SERVER PROVISIONING FOR BLADE ARCHITECTURES

(75) Inventor: Francisco J. Romero, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1236 days.

(21) Appl. No.: 10/245,669

(22) Filed: Sep. 16, 2002

(65) Prior Publication Data

US 2004/0054780 A1    Mar. 18, 2004

(51) Int. Cl.
G06F 15/173 (2006.01)
(52) U.S. Cl. .................................. 709/226; 709/224
(58) Field of Classification Search .......... 709/226, 709/224
See application file for complete search history.

(56) References Cited

U.S. PATENT DOCUMENTS

| 6,151,688 | A * | 11/2000 | Wipfel et al. ............ 714/48 |
| 6,182,109 | B1 * | 1/2001 | Sharma et al. ........... 718/104 |
| 6,223,202 | B1 * | 4/2001 | Bayeh .................... 718/102 |
| 6,460,082 | B1 * | 10/2002 | Lumelsky et al. ........ 709/226 |
| 6,901,446 | B2 * | 5/2005 | Chellis et al. ........... 709/226 |
| 7,032,037 | B2 * | 4/2006 | Garnett et al. ........... 710/2 |
| 7,051,098 | B2 * | 5/2006 | Masters et al. .......... 709/224 |
| 2002/0069279 | A1 * | 6/2002 | Romero et al. .......... 709/225 |
| 2002/0087694 | A1 |  7/2002 | Daoud et al. |
| 2003/0037092 | A1 |  2/2003 | McCarthy et al. |
| 2003/0126202 | A1 * | 7/2003 | Watt .................... 709/203 |
| 2004/0162901 | A1 * | 8/2004 | Mangipudi et al. ........ 709/225 |
| 2005/0182838 | A1 * | 8/2005 | Sheets et al. ............ 709/226 |
| 2006/0129687 | A1 * | 6/2006 | Goldszmidt et al. ...... 709/229 |

FOREIGN PATENT DOCUMENTS

| JP | 2002-132741 | 5/2002 |
| JP | 2002-202959 | 7/2002 |
| JP | 2002-245017 A | 8/2002 |
| JP | 2004-082911 A | 3/2004 |
| WO | WO-02007037 | 1/2002 |

OTHER PUBLICATIONS

Warren, M. S., High-Density Computing. A 240-Processor Beowulf in One Cube Meter, Supercomputing. ACM/IEEE 2002 Conference. ACM/IEEE. Nov. 22m, 2002, pp. 1-11.

* cited by examiner

Primary Examiner—John Follansbee
Assistant Examiner—Alan S Chou

(57) ABSTRACT

A system and method for automatically allocating computing resources of a rack-and-blade computer assembly. The method includes receiving server performance information from an application server pool disposed in a rack of a rack-and-blade computer assembly, and determining at least one QoS attribute for the application server pool. If the QoS attribute is below a standard, a blade server is allocated from a free server pool for use by the application server pool. If the QoS attribute is above a standard, at least one server is removed from the application server pool. An article of manufacture including a machine-readable medium having stored thereon instructions for automatically allocating computing resources of a rack-and-blade computer assembly.

55 Claims, 4 Drawing Sheets

DYNAMIC ADAPTIVE SERVER PROVISIONING FOR BLADE ARCHITECTURES

CROSS-REFERENCES TO RELATED APPLICATIONS

This patent application is related to the following commonly assigned patent applications: U.S. patent application Ser. No. 09/493,753, entitled "Dynamic Management of Computer Workloads Through Service Level Optimization," filed Jan. 28, 2000; U.S. patent application Ser. No. 09/562,590, entitled "Reconfiguration Support for a Multi-Partition Computer System," filed Apr. 29, 2000; and U.S. patent application Ser. No. 10/206,594, entitled "Dynamic Management of Virtual Partition Computer Workloads Through Service Level Optimization," filed Jul. 26, 2002. All of these U.S. patent applications are fully incorporated herein by reference thereto, as if repeated verbatim immediately hereafter.

BACKGROUND OF THE INVENTION

1. Field of the Invention

Embodiments of the present invention relate generally to computer systems. More particularly, embodiments of the present invention relate to a rack-and-blade computing system and method for automating how computing resources (e.g. blade servers) are allocated to workloads for meeting quality of service requirements.

2. Description of the Background Art

The information technology (IT) industry is demanding higher computer density per square foot of datacenter space in order to reduce costs while at the same time IT service delivery capabilities must increase. Another key trend in blade servers has been the standardization of server architectures around Intel processors and chipsets, and Windows or Linux operating environments. Inexpensive industry-standard servers running Windows or Linux are proliferating in the datacenter, creating a manageability problem. With more servers entering the datacenter, IT organizations must hire additional system administrators to manage the servers and the applications they run. In response to requirements for higher density and lower management-cost systems, many major vendors have recently introduced products based on a new server architecture, a "rack and blade" architecture.

Broadly, a blade server is a thin, modular electronic circuit board, containing at least one (e.g., two or more) microprocessors and memory and optionally permanent storage. More specifically, a blade server is a single, self-contained computer-motherboard, processor, memory, disk and connectivity—that screws into a slot on a standard space-saving computer rack. All blade servers typically share a single (or more commonly, a dual redundant) power supply, fans, and backbone. The connectivity of the blade servers to the backbone is either proprietary or standards-based (e.g., such as Compact PCI).

A blade server is typically intended for a single, dedicated application (such as serving web pages) and may easily be inserted into a slot on the space-saving rack which many include similar servers. Some space-saving racks, by way of example only, have the capacity to install up to 280 blade servers in a standard 42 U racks, all sharing a common high-speed bus and designed to create less heat, thus saving energy costs as well as space. Large data centers and Internet service providers (ISPs) that host Web sites are among the users of blade servers.

A blade server is sometimes referred to as a "high-density server" and is typically used in a clustering of servers that are dedicated to a single task, such as file sharing, web page serving and caching, SSL encrypting or web communication, transcoding of web page content for smaller displays, and audio and video content streaming. A blade server usually comes with an operating system and is normally dedicated to a single application or application component. The storage required by the blades could be embedded in the blade, or available externally via standard connectivity mechanisms such as Storage Area Networks (SAN), or Network Attached Storage (NAS). The operating system and applications required to operate the blades can be loaded from the storage device(s) available to the blades.

Like more traditional clustered servers, blade servers can also be managed to include load balancing and failover capabilities. Load balancing is dividing the amount of work that a blade server has to do between two or more blade servers so that more work gets done in the same amount of time and, in general, all users get served faster. Load balancing may be implemented with hardware, software, or a combination of both. Typically, load balancing is the main reason for blade server clustering. Failover is a backup operational mode in which the functions of a primary blade server are assumed by a secondary blade server when the primary blade server becomes unavailable through either future or scheduled down time.

Recent developments, such as the storage area network (SAN), make any-to-any connectivity possible among blade servers and data storage systems. In general, storage networks use many paths—each consisting of complete sets of all the components involved—between the blade server and the system. A failed path can result from the failure of any individual component of a path. Multiple connection paths, each with redundant components, are used to help ensure that the connection is still viable even if one (or more) paths fail. The capacity for automatic failover means that normal functions can be maintained despite the inevitable interruptions caused by problems with equipment.

Most blade server offerings today provide an integrated management solution. For example, the Dell PowerEdge 1655MC includes a management card that provides chassis and blade monitoring and remote power control through a dedicated management network, as well as operating system independent keyboard, video and mouse capability. The HP ProLiant BL e-Class includes Integrated Administrator, an integrated server blade management solution for remote or local access. It also includes a rapid deployment solution that makes it possible to install the operating system and applications on one or more blade servers from a central image repository.

Blade server architectures are ideal for information technology (IT) services or applications that can "scale out" or horizontally; that is, that can expand in capacity by adding additional servers to the pool of servers performing a task. Some examples of services that scale horizontally are: web servers, primarily via HTTP; file servers, normally FTP, but also includes media streaming; and application servers.

Multiple web servers can be connected to a load-balancing network device to share the task of serving webpage requests. File servers are multiple servers that may combine to provide higher throughput. There is normally a traffic management device in front of these servers to virtualize access to the service over the network. Application servers are servers that execute business logic on a standard platform, such as Java 2

Enterprise Edition. Multiple application servers may operate together to deliver a higher service capacity, by sharing the load.

While most major vendors today offer integrated management solutions with blade servers, these solutions fall short of providing full provisioning automation. The operator must decide what applications or services run on what blade servers, and manage availability and performance on each blade server using tools, such as for instance, Insight Manager or Openview, both from HP. In case of spikes in demand, it might be necessary to increase the number of blade servers supporting an application, as in the case of a rapid increase in website hits. To respond quickly significant human intervention is required, even when taking advantage of performance monitoring and alarming and rapid deployment. For example, in order to maintain a pre-specified level of HTTP service running on a group of blades, it may be necessary to perform a number of steps.

One step would be to ensure that a performance monitoring service must be in operation to detect degradation in quality of service, so that appropriate action can be taken. There are many different mechanisms to assert performance degradation, most are based on system-level performance metrics such as CPU consumption thresholds, number of processes, number of concurrent active connections, and others. The performance monitoring service may also be obtained at the application level, for example, the number of pages served per unit of time, or the average response time per request.

Another step would be to select a candidate blade server that can be allocated to perform the service requiring additional server resources. This process might require identifying another service provided by the rack that can withstand a decrease in the number of servers running it. Alternatively, the blade server can be obtained from a free pool of standby servers maintained by the system administrator.

Once a candidate blade server is identified for allocation, if already actively performing a service, the candidate blade server needs to be "flushed" of data and processes, and reconfiguration notifications sent to traffic management devices which direct traffic to this blade server, so that traffic is no longer routed to it. The flushing process may also involve reassignment of IP addresses to this blade server.

A further step that may be necessary to maintain a pre-specified level of HTTP service operating on a group of blade servers would be that the candidate blade server may need to be preloaded with the operating environment and the application binaries that it needs to perform the desire task. In order to execute this step it would be necessary to have a rapid deployment system that an operator may use to select the right image from a repository and load it on the candidate blade server.

Once the operating system and the application code are loaded, it would then be necessary to configure the candidate blade server. This could involve the addition of data and agents, and any other steps that are specific to this candidate blade server and not captured by the previously indicated rapid deployment step. Once the candidate blade server is configured and running, it would then be necessary to add it to the pool of blade servers performing the same task. This normally demands a configuration change to the traffic management device which directs traffic to the blade server pool.

Finally, after all of the indicated steps have been performed, the performance monitoring loops starts again with the reconfigured pool. At regular intervals, or when alarms go off, capacity demands are examined by the monitoring tools, and blade servers are again rebalanced to meet overall service level objectives for all the services deployed on the rack.

SUMMARY OF EMBODIMENTS OF THE INVENTION

Embodiments of the present invention provide a method for automatically allocating computing resources of a rack-and-blade computer assembly. The method comprises receiving server performance information from an application server pool disposed in a rack of a rack-and-blade computer assembly, determining at least one QoS attribute (e.g., an aggregate of QoS attributes) for the application server pool, determining that the QoS attribute is below a standard, and allocating for use by the application server pool a blade server from a free server pool. The method may additionally comprise selecting, prior to allocating for use, a blade server from a free server pool to obtain a selected blade server, and preparing, prior to allocating for use, the selected blade server for operation with the application server pool. The method may further additionally comprise reconfiguring a traffic management device associated with the application server pool. A machine-readable medium is provided having stored thereon instructions for performing one or more of the features of embodiments of this method for automatically allocating computing resources of a rack-and-blade computer assembly.

Embodiments of the present invention also provide a method for automatically allocating computing resources for a rack-and-blade computer assembly. The method comprises receiving server performance information from an application server pool disposed in a rack of a rack-and-blade computer assembly, determining at least one QoS attribute (e.g., an aggregate of QoS attributes) for the application server pool, determining that the QoS attribute is above a standard, and removing the use of a blade server from the application server pool. The method may additionally comprise allocating the removed blade server for use by a free server pool. A machine-readable medium is provided having stored thereon instructions for performing one or more of the features of embodiments of this method for automatically allocating computing resources of a rack-and-blade computer assembly.

Embodiments of the present invention further provide a method for automatically allocating computer resources of a rack-and-blade computer assembly. The method comprises receiving server performance information from an application server pool disposed in a rack of a rack-and-blade computer assembly, determining at least one QoS attribute for the application server pool, determining that the QoS attribute is below a standard, determining that no blade server in a free server pool is available for use, and improving a lower priority blade server for use by the application server pool. The method may additionally comprise selecting, prior to improving use, a blade server from the application server pool to obtain a selected blade server. Improving the selected blade server for use comprises preparing the selected blade server for operation with the application server pool. The method may further additionally comprise flushing the selected blade server, and reconfiguring a traffic management device associated with the application server pool. A machine-readable medium is provided having stored thereon instructions for performing one or more of the features of embodiments of this method for automatically allocating computing resources of a rack-and-blade computer assembly.

Embodiments of the present invention also provide a method for automatically allocating computing resources of a rack-and-blade computer assembly comprising receiving server performance information from an application server pool disposed in a rack of a rack-and-blade computer assembly, determining at least one QoS attribute for the application server pool, and determining that the QoS attribute is below a standard. Embodiments of the method also provide determining that a free server pool has a blade server for use, and selecting from the free server pool the available blade server for use by the application server pool. Further embodiments of the method include installing software on the selected available blade server and/or configuring the selected available blade server and/or readying the selected available blade server for operation and/or reconfiguring a traffic management device associated with the application server pool. A machine-readable medium is provided having stored thereon instructions for performing one or more of the features of embodiments of this method for automatically allocating computing resources of a rack-and-blade computer assembly.

Embodiments of the present invention also further provide a system for automatically allocating computing resources of a rack-and-blade computer assembly comprising a means for receiving blade server performance information from a rack-and-blade computer assembly, and a means, coupled to the means for receiving blade server performance information, for managing an image repository. The system may further include a data base means, coupled to the means for receiving blade server performance information, for storing at least one policy, and a repository means, coupled to the means for receiving blade server performance information, for storing hardware information. The rack-and-blade computer assembly comprises a free server pool, and at least one (e.g., two or more) application server pool.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1:
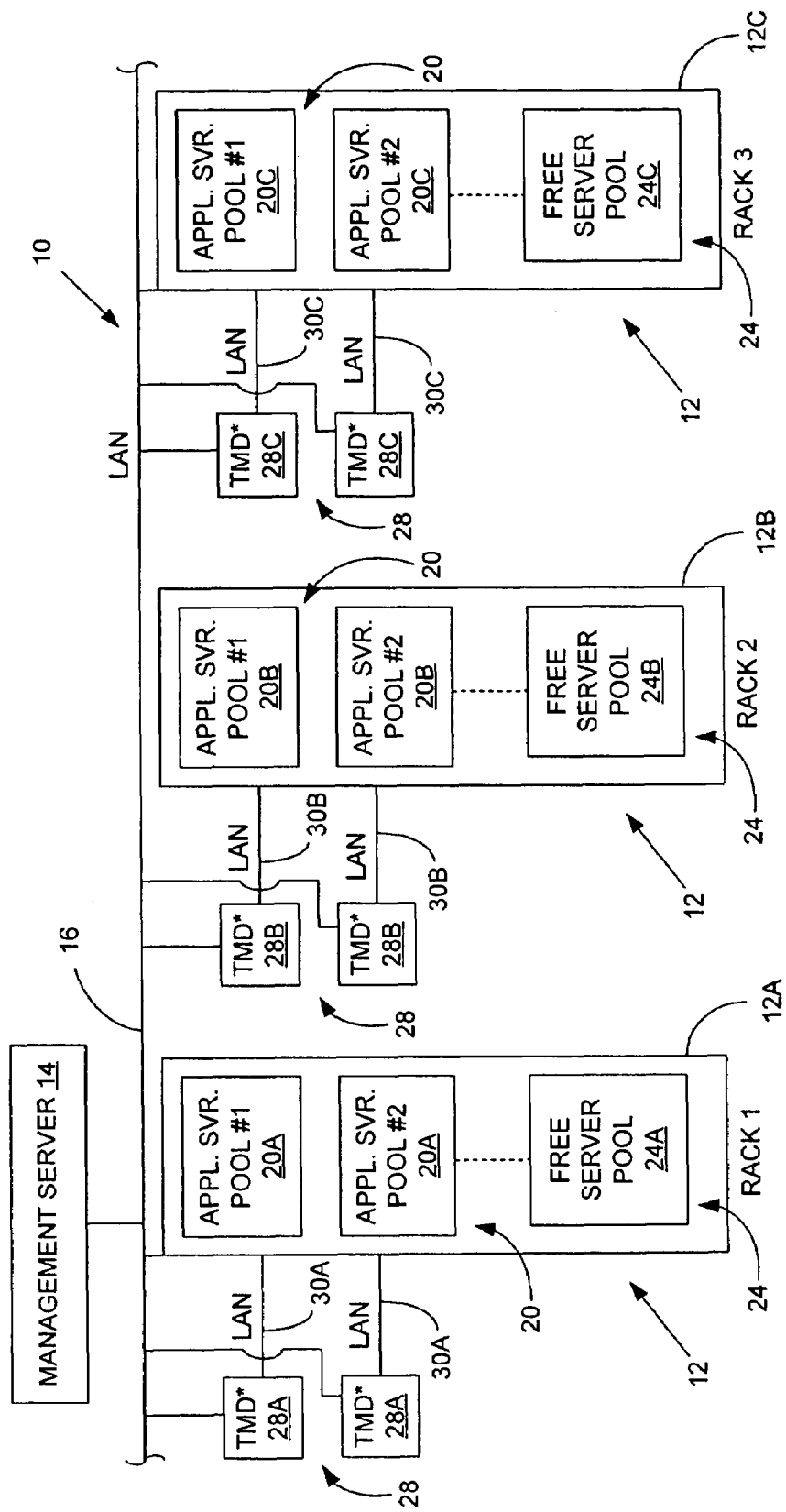
FIG. 1 is a schematic diagram of a plurality of racks, with each rack containing at least one application server pool (ASP).

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions which are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "Quality of Service", or QoS, attribute for embodiments of the present invention may define a measurable characteristic of a primitive, more specifically a level of performance to be delivered by any particular application to the control system. By way of example only, a QoS may be "Deliver X Mb/s Aggregate Throughput" for a file service, or "Process N Email Messages Per Second" for an E-mail exchange service. A QoS attribute may also be defined in terms for the computer system, instead of terms for any particular application of the control system. By further way of example only, a QoS in a computer system term may be "Maintain CPU Load Below X Percent On Each Server Contributing To This Service". Such a proxy QoS attribute may be employed when it is difficult to measure attributes at the application level. A QoS attribute may also known as a "Service Level Objective" or SLO.

A "Resource Allocation Primitive" for various embodiments of the present invention defines an action to be conducted by embodiments of the control system to achieve a specific QoS attribute. One of the more common Resource Allocation Primitive operations in a blade server architecture would be to add or remove blade servers from an application server pool, particularly in order to maintain a QoS attribute with the smallest number of servers.

A "Policy" for various embodiments of the present invention may be a rule that defines pairs, such as a QoS attribute and a Resource Allocation Primitive pair. A pair policy makes it possible to define quality of service demands and actions that need to be taken to maintain any quality of service attributes. A Policy may be a description that makes it possible for a QoS attribute to be maintained by an automated control system.

A "Traffic Management Device" (TMD) functions as a routing device for a request for service which typically may emanate from the Internet or Intranet in distributed applications. A Traffic Management Device directs request for service to an appropriate blade server that is capable of service any particular request for service. By way of example only, a Traffic Management Device may be a load balancing appliance, which will route HTTP traffic to one or more of several possible blade servers in a pool of blade servers using some predefined mechanism, such as round-robin, least-loaded, or any of the like. It is desired to take advantage of the coupling of blade servers in a rack, in conjunction with integrated management primitives, to provide an automated mechanism for mapping workloads to blade servers in such a manner that optimal performance may be obtained for the lowest possible cost.

A "Rapid Deployment System" (RDS) for various embodiments of the present invention includes a system or facility or service that allows operating system and application images to be stored in a central repository and installed remotely on a blade server. For purposes of various embodiments of the present invention, a Rapid Deployment Service is available to each blade server, and could make or produce any code necessary to boot its associated blade server. The Rapid Deployment Service for each blade server may also make the application of the code available via networking operations installed on a local blade storage if that is the only storage available to the respective blade server.

An "Application Server Pool" or ASP is a group of blade servers that act in conjunction to deliver a desired service. All blade servers of an ASP may run the same operating environment and the same application. An Application Server Pool is typically coupled to a Traffic Management Device that routes traffic to the respective blade servers associated with any Application Server Pool. An Application Server Pool will have one or more QoS attributes associated with it, as well as a relative priority which will be used when it is necessary to remove a blade server from an Application Server Pool to meet the needs of a higher priority Application Server Pool and no blade servers are available for use in any Free Server Pool.

A "Free Server Pool" (FSP) is a group of blade servers which are not currently allocated to any Application Server Pool. One or more blade servers from the Free Server Pool may be allocated in accordance with the dynamic, adaptive blade server provisioning for various embodiments of the present invention. The blade server(s) on the FSP are on standby; that is, they are powered up and connected to the network, but are not running an operating system. One or more blade servers in the FSP may be preloaded with the operating system (OS) and the application most likely to be needed.

Referring now to FIG. 1 there is broadly illustrated a schematic diagram of a rack-and-blade computing system, generally illustrated as 10, for various embodiments of the present invention. The rack-and-blade computing system 10 includes at least one rack, more specifically a plurality of racks, generally illustrated as 12, comprising rack 12a, rack 12b and rack 12c. The racks 12 are coupled to a management server 14 via a local area network (LAN), generally illustrated as 16. The LAN 16 functions as a signal interface between the management server 14 and respective racks 12a, 12b, and 12c. Management Server 14 works across and operatively spans multiple racks 12. The ASPs 20 may be and are typically dedicated to their respective associated rack 12. The rack-and-blade computing system 10 executes various embodiments of the dynamic provisioning system which is administered through the management server 14.

Rack 12a, rack 12b, and rack 12c, contain at least one Application Server Pool (ASP), generally illustrated as 20 in each of the racks 12. More specifically, rack 12a, rack 12b, and rack 12c respectively includes No. 1 ASP 20a and No. 2 ASP 20a, No. 1 ASP 20b and No. 2 ASP 20b, and No. 1 ASP 20c and No. 2 ASP 20c. Each of the ASPs 20 has at least one blade server (identified as "34" below) which is capable of executing or running a desired service or application.

Optionally, at least one of the racks 12 contains a Free Server Pool (FSP), generally illustrated as 24, which is unallocated to any of the ASPs 20 in the racks 12. It is to be understood that any FSP 24 would contain at least one free blade server which would be capable of running a desired service or application. It is also to be understood that the maximum number of blade servers in any particular ASP 20 is the total number of blade servers in a particular rack 12 minus the number of active blade servers in a particular Free Server Pool 24. As best shown in FIG. 1, racks 12a, 12b, and 12c respectively include FSP 24a, FSP 24b, and FSP 24c. Each of the ASPs 20 may be coupled, if desired, to a Traffic Management Device (TMD), generally illustrated as 28 externally to each of the racks 12, and each of the Traffic Management Devices 28 may be coupled to the LAN 16. More specifically and as further best shown in FIG. 1, ASPs 20a-20a, 20b-20b, and 20c-20c are respectively coupled to TMDs 28a-28a, 28b-28b and 28c-28c through associated local LANs, generally illustrated as 30 externally to each rack 12, and TMDs 28a-28a, 28b-28b and 28c-28c in turn are respectively coupled to the Network Backbone 16. Local LANs 30 may be more specifically illustrated as 30a-30, 30b-30b and 30c-30c, and, as indicated, couple respective TMDs 28 to respective racks 12.

Figure 2:
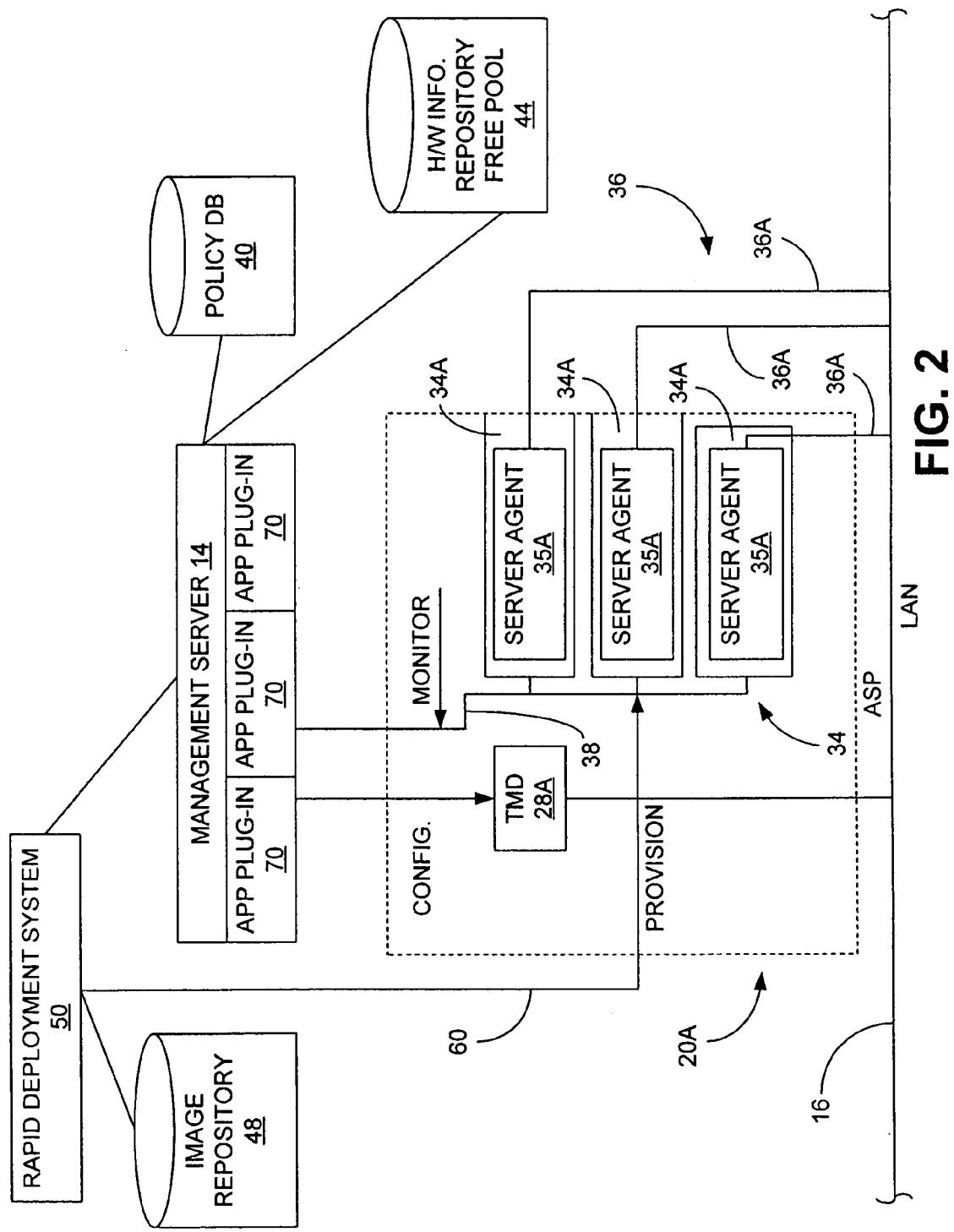
FIG. 2 is a schematic diagram of the software data bases for embodiments of the rack-and-blade computing system and method for automating how computing resources (e.g., blade servers) are allocated to computer workloads.

Referring now to FIG. 2 there is seen ASP 20a including at least one blade server, generally illustrated as 34. More specifically ASP 20a includes blade servers 34a-34a-34a, each of which has an associated server agent 35a. Each of the blade servers 34 including any associated server agent communicates with the Network Backbone 16 through channel lines, generally illustrated as 36. More specifically, respective blade servers 34a-34a-34a including their respective associated server agents 35a-35a-35a, communicate with LAN 16 through respective channel lines 36a-36a-36a. The blade servers 34a-34a-34a including their respective associated server agents 35a-35a-35a also communicate with the management server 14 through a monitoring channel line 38.

While ASP 20a has been described to include blade servers 34a-34a-34a and their associated server agents 35a-35a-35a, it is to be understood that ASP 20b and ASP 20c would also have similar blade servers with an associated server agent and would communicate with the LAN 16 through channel lines similar to channel lines 36. Also, while the blade servers 34a-34a-34a, along with their associated server agents 35a-35a-35a, of ASP 20a have been illustrated as communicating with the management server 14 via monitoring channel line 38, it is to be understood that the blade servers, along with their associated server agents, of ASP 20b and ASP 20c would also communicate with the management server 14 via similar monitoring channel lines.

Figure 3:
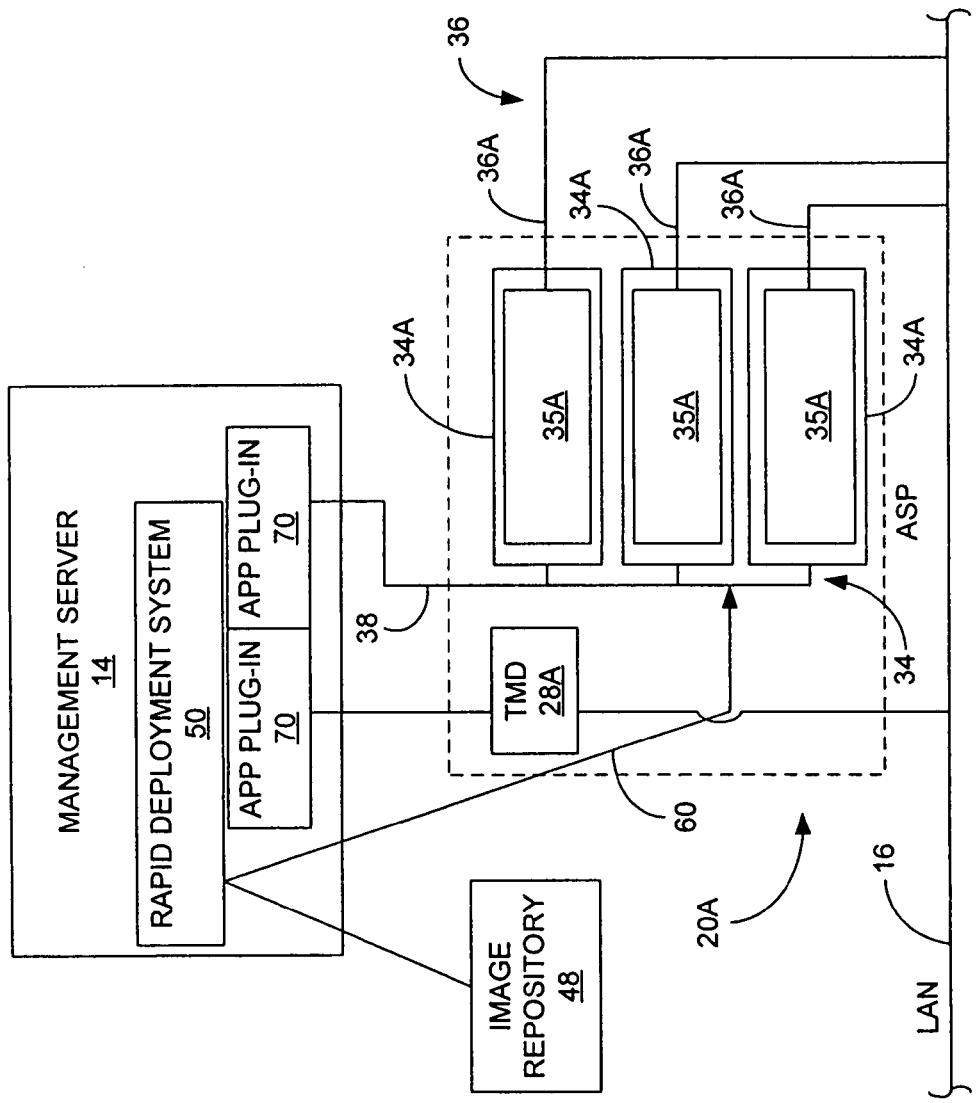
FIG. 3 is a schematic diagram of the management server containing the rapid deployment system and communicatively engaged to the image repository and to blade servers of an application server pool.

Continuing to refer to FIG. 2 and referencing also now FIG. 3, there is seen the management server 14 coupled to data repositories, more particularly to a policy database 40, and a hardware information repository (HIR). There is also seen a rapid deployment system 50 communicatively coupled to the management server 14 and to an image repository 48. The rapid deployment system 50 manages the image repository 48, and communicates with the LAN 16 via provisioning line 60. As shown in FIG. 3, the management server 14 may include the rapid deployment system 50 which can install any desirable operating system (OS) and/or application onto one or more of the blade servers 34 of any ASP 20. More specifically, the management server 14 may provision images (e.g. such images as disk images containing any desired operating system and/or application) from the image repository 48 through the provisioning line 60 onto one or more blade servers 34 by employing the rapid deployment system 50. The management server 14 possesses the capabilities to use and instruct its associated rapid deployment system 50 to deploy and/or remove any of the blade servers 34 of any ASP 20, as well as any of the blade servers of the free server pool(s) 24.

It is to be understood that the rapid deployment system 50 could IO-reside with the management server 14, or it could be deployed on a separate server.

The policy database 40 stores all the QoS attributes and actions in the form of a Policy, more specifically in the form of policies or rules. The hardware information repository 44 contains information about all of the hardware it manages, such as by way of example only, information about the ASPs 20 and their associated blade servers 34, and information about the FSPs 24.

The management server 14, as indicated, communicates with each of the blade servers 34 as well as their associated server agents 35*a*. A server agent 35*a* measures performance of the application running on its associated blade server 34*a*. The measurement may be done at the hardware level, for example, CPU and memory utilization, or at the application level, using application-specific measurements. A standard mechanism such as Web-based Enterprise Management (WBEM) or Systems Network Monitoring Protocol (SNMP) may be used to communicate this information from any server agent 35*a* to the management server 14. The server agent 35*a* may also transmit alarms (e.g., SNMP traps) asynchronously to the management server 14. The server agents 34*a* may contain application-specific components to measure any desired application-level performance. By way of example only, a server agent 35*a* which is monitoring a Microsoft Exchange server will possess the capabilities to obtain from and to track messages processed per unit of time by the Microsoft Exchange server.

As further best shown in FIGS. 2 and 3, the management server 14 includes an application plug-in 70 for each application which is supported by each of the ASPs 20. Thus, there is typically a plurality of application plug-ins 70. Each application plug-in 70 correlates metrics (i.e., a quantitative measure of a degree to which an attribute is processed, or a value calculated from observed attribute values) emanating from each server agent 35*a* on the blade servers 34, as well as providing a current metric of how well each of the ASPs 20 is meeting its QoS attribute(s). The management server 14 also possesses the ability to configure each of the traffic management devices 28 which route traffic to the blade servers 34 in the respective ASPs 20. Each of the traffic management devices 28 communicates with the management server 14 using standard management protocols, such as SNMP.

Figure 4:
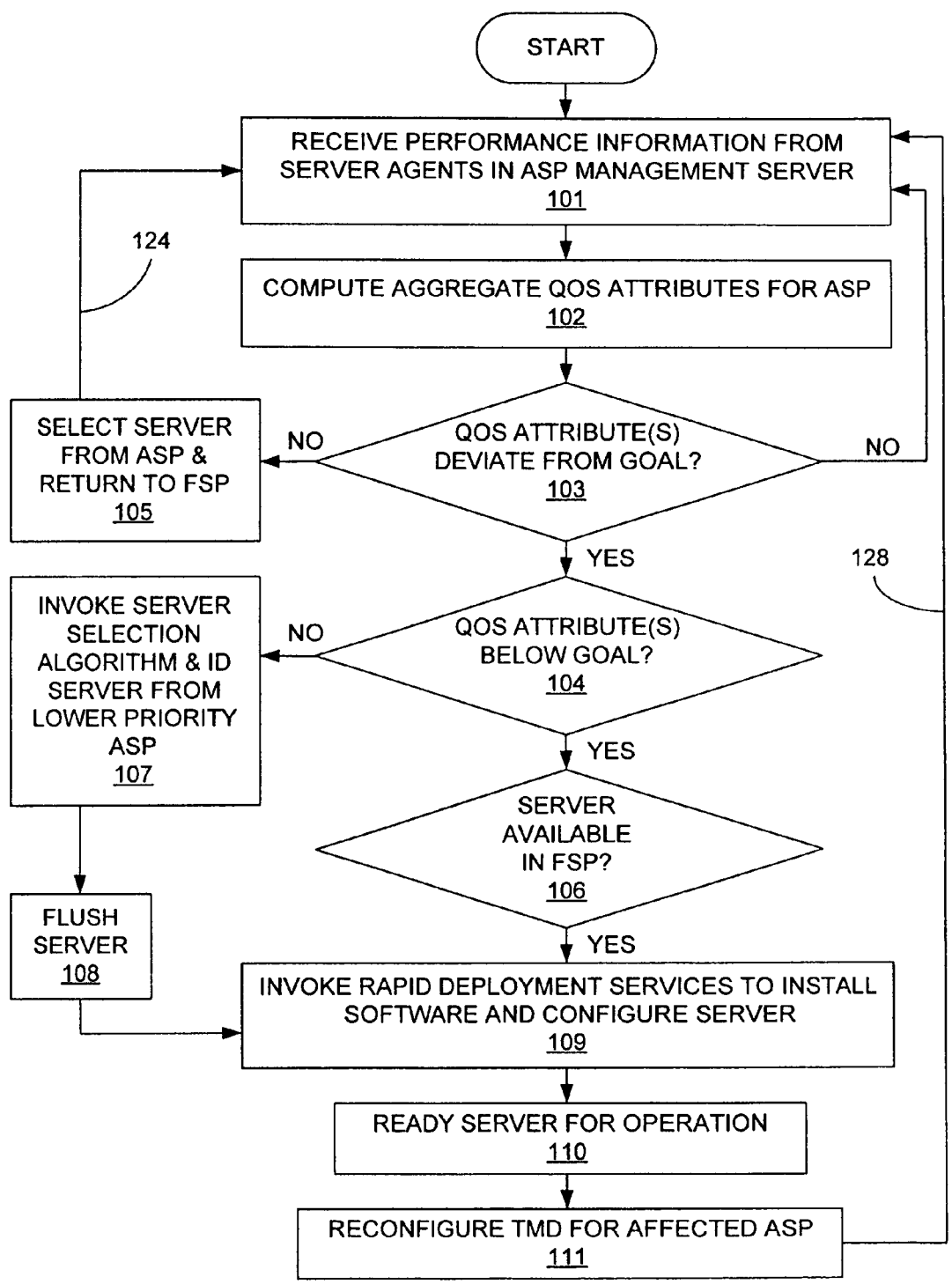
FIG. 4 is a block flow diagram of a control system for operating embodiments of the invention.

Referring now to FIG. 4 there is seen a block flow diagram for representing an operation of embodiments of the present invention. The operation represented by FIG. 4 is generally an endless, continuously running operation, only stopping or pausing for repairs or maintenance. The management server 14 is typically postured in an idle loop, waiting to receive information from the server agents 35*a* associated with the blade servers 34. As indicated, the management server 14 monitors the performance of each of the blade servers 34 from the information received by the server agents 35*a* from the blade servers 34 and subsequently transmitted. The management server 14 wakes up when information is transmitted from the server agents 35*a* to it via the monitoring channel line 38, or when the new polling cycle starts. The information passed by the server agents 35*a* to the management server 14 via the monitoring channel line 38 consists of numeric data presenting the performance of the application on the associated blade server 34*a*. For example, the server agent 35*a* may create a composite number that reflects performance of the application on the associated blade server 34*a*. The information may be transmitted to the management server 14 either synchronously via polling at regular or periodic intervals, or synchronously via alarms sent by the respective server agents 35*a*. If polling is frequently conducted, alarm transmission would not be necessary and would become an optional feature.

After the management server 14 receives the server-performance information from each of the server agents 35*a* associated with the blade servers 34 in accordance with step 101 of FIG. 4, all of the received server-performance information is collated, correlated and consolidated by the management server 14 which then computes or determines at least one QoS attribute(s) for the respective ASPs 20. More specifically and as represented by step 102, the respective Application Plug-Ins 70 associated with the management server 14 for each of the ASPs 20 computes or determines at least one QoS (e.g. an aggregate QoS) for each of the ASPs 20. If the QoS attribute(s) measured or determined for the particular application or service request running or being performed by an ASP in one of the racks 12 diverge, deviate or is skewed from a standard or goal set or placed in the Policy DB 40 by a user, then a determination is made in accordance with step 103 if the measured or determined QoS attribute(s) fall above or below the standard or goal. If there is no deviation from the goal or standard in accordance to step 103, no action is required by the management server 14 and the management server 14 then goes back to an idle loop via return loop 120 in FIG. 4.

As indicated for an idle loop, the management server 14 in an idling posture is monitoring through the monitoring channel line 38 the performance of the blade servers 34 via information transmitted by the server agents 35*a* associated with the blade servers 34. If the measured QoS attribute(s) is not below the goal in accordance with step 104, then the measured QoS attribute is above the goal objective, and the subject ASP 20*a* is overprovisioned and is not optimally operating. Thus, blade server capacity of the subject ASP 20*a* should be reduced in order to make the excess servers available to other ASPs 20. It is possible in the Policy DB 40 to specify thresholds of overprovisioning required for action, as well as any frequencies for action.

If the measured QoS attribute(s) is not below the goal or standard in accordance with step 104, then the measured QoS attribute is above the standard or goal and action by the management server 14 is to be executed. The action taken, as represented by block 105, is for the management server 14 to select one or more of the blade servers 34 of the subject ASP 20*a* and return it or them to the FSP 24*a* associated with the subject ASP 20*a*. Step 105 would place more workloads on the remaining blade servers 34, and would also require reconfiguration of the TMD 28*a* associated with the subject ASP 20*a*. The TMD 28*a* may be reconfigured by the management server 14 by issuing a configuration command that would remove the selected blade server from its current configuration. For example, if the TMD 28*a* is a load balancer, the management server 14 would reconfigure the load balancer to remove the selected blade server from the pool of servers to which the load balancer directs traffic.

Optionally, before the use or availability of one of more of the blade servers 34 is returned to the FSP 24*a*, the addressable memory and storage of one or more blade servers 34 may be flushed or cleansed so if recalled for service in the ASP 20*a*, all of the addressable memory and storage will be available for use in performing any application or service request, and also as a security measure. After the blade server selection process has been executed by the management server 14 and one or more selected blade servers 34 has been returned to FSP 24*a*, the management server 14 then goes back to an idle loop via return loop 124 in FIG. 4.

If the aggregate QoS attribute is below the goal in accordance with a determination made by step 104, then a blade server provisioning step should be executed. The number of blade servers for provisioning, as well as the severity of the deviation of the aggregate QoS attribute from the defined standard or goal, the frequency of provisioning, as well as any other desired factors, may be predefined in the Policy DB 40. The blade server provisioning step includes determining in accordance with step 106 if the FSP 24a has one or more blade servers 34 available for draft into the subject ASP 20a. If, no blade servers 34 are available in the FSP 24a, then a blade server selection process is executed in accordance with step 107 where a blade server selection algorithm is invoked and an identification is made of one or more blade servers 34 from a lower priority ASP 12, all as illustrated and particularly described in previously mentioned U.S. patent application Ser. Nos. 09/562,590, 09/493,753 and 10/206,594, fully incorporated herein by reference thereto as if repeated verbatim hereinafter.

More particularly and as disclosed in application Ser. No. 10/206,594, a partition load manager, or the respective ASP Application Plug-Ins 70, receives resource request information from the associated ASPs 20 of the system. The ASP Application Plug-In 70 preferably examines the resource request information, and compares the request information with the available resources. Based on the comparison, the ASP Application Plug-In 70 may increase, decrease, or leave unchanged, a particular ASP's resources. If the performance of an ASP 20 is lagging (e.g., if transactions are taking longer than the goals), then the ASP 20 may request an increase in the resource entitlement from the ASP Application Plug-In 70. If an ASP 20 is over-achieving, then the ASP Application Plug-In 70 may inform the ASP Application Plug-In 70 that it has excess resources, and the ASP Application Plug-In 70 may decrease its entitlement and allocate it to one or more ASPs 20. An allocator (not shown) may be provided to resize the ASPs 20, which is to move resources from one or more blade servers 34 to one or more other blade servers 34 based on the instructions provided by the blade load manager (i.e., management server 14).

The management server 14 receives goal information and priority information from a user or administrator. Such goal and priority information may be the same for all blade servers 34 of each ASP 20 or the information may be specific to each blade server 34 or groups of blade servers 34 of any respective ASP 20. The management server 14 also receives additional information from performance monitors, which are processes that monitor the performance of the application within each of the blade servers 34 within each ASP 20. The management server 14 examines the information from the performance monitors and compares the information with the goals. Based on the comparison, the management server 14 may increase, decrease, or leave unchanged, an application's entitlement. If the performance of an application is lagging, e.g., if transactions are taking longer than the goal, then the management server 14 increases the entitlement. If an application is overachieving, then the management server 14 will decrease its entitlement and allocate it to another application. Thus, the management server 14 many determine a resource request value for the computer resource based on at least one priority assigned to blade servers 14 of respective ASPs 20 associated with the computer resource. The management server 14 is operative to form an allocation value for each blade server 14 of respective ASPs 20 based on a respective resource request value such that embodiments of the rank-and-blade computing system apportions the computer resource among the ASPs 20 based on the allocation values.

It is to be noted that the management server 14 also interacts with respective ASP Application Plug-Ins 70. The management server 14 periodically, after determining the resource needs of the system including each ASP 20, sends resource request information to each ASP Application Plug-In 70, which in turn, after receiving the resource request information, allocates system resources between the respective ASPs 20. The management server 14, after receiving information about the resources of the ASPs 20. While respective ASP Application Plug-Ins 70 reside with one ASP 20, each ASP Application Plug-In 70 has access to other ASP Application Plug-In 70. Alternatively, an ASP Application Plug-In 70 may reside in a service module that manages all of the ASPs 20 of a rack 12. Alternatively further and as previously indicated, any ASP Application Plug-In 70 may reside in each ASP 20, and cooperatively allocate resources amongst the respective contained blade servers 34.

As previously indicated, an ASP arbiter or resource allocator (not shown) allocates the resources between the various ASPs 20, based on the priorities of the ASPs 20 and the resource requests. This movement of resources may be referred to as re-sizing ASPs 20. An ASP 20, preferably through the management server 14, maintains a list of prioritized application goals with an indication of the quantity of each required resource. Application goals of equal priority are treated equally. An application may have more than one goal. The request of higher priority application goals are satisfied before lower priority application goals. Unallocated resources may be held in reserve or assigned to default partition. It should be noted that applications of a default ASP 20 may always be exceeding its goals, and thus require a rule that such a condition is not an event to cause reallocation of resources or resizing of ASPs 20.

Thus, the selection process represented by step 107, looks at the relative performance of other ASPs 20a in the same rack 12 (e.g., rack 12a), as well as their priorities, to identify the one or more blade servers 34a that would impact performance the least if reallocated to another ASP 20a.

After one or more blade servers 34a have been selected in accordance with step 107, the selected blade server(s) 34a is/are flushed, and subsequently prepared for reprovisioning. If one or more available blade server(s) is or are selected from the FSP 24a in accordance with step 106, it or they too must be reprovised. In order to reprovise any blade server (i.e., a blade server selected in accordance with step 107 or an available blade server selected from FSP 24a in accordance with step 106), the selected blade server needs to be initially repurposed (e.g., installation or appropriate software and configured) by the rapid deployment services of the rapid deployment system 50 in accordance with step 109. More specifically, the rapid deployment system 50 creates a new personality for a blade server by installing a new image of the operating system and the application. In addition, the rapid deployment system 50 will configure any particular blade server and ready it for service. As previously indicated, an image stored in the image repository 48 may include a disk image of the operating system as well as the application(s). The rapid deployment system 50 removes the image bits from the image repository 48 and copies them to a hard disk of a blade server in preparation for configuration and booting. Thus, the appropriate image may be selected from the image repository 48 and subsequently installed on the one or more selected blade servers 34.

Subsequently, after configuration and the invocation of the rapid deployment services from the rapid deployment system 50 for the repurposing of the one or more selected blade server(s), the repurposed, configured one or more selected blade server(s) 34 are subsequently readied for operation in accordance with step 110. Readying a blade server for operation involves any configuration operations needed to be performed after the image is installed and prior to the blade server being declared ready. Finally, the appropriate TMD 28a, associated with the ASP 20a that has received for use, the readied, repurposed, configured blade server(s) 34, is itself reconfigured in accordance with step 111 to account for the extra or added one or more blade server(s) 34 that now are available for use in the ASP 20a. After step 111, the management server 14 then goes back to an idle loop via return loop 128 in FIG. 4.

Thus, by the practice of various embodiments of the present invention ASPs 20 (e.g., ASPs 20a) only grow or shrink in the number of blade servers 34 while residing in their respective racks 12 (e.g., rack 12a). No selection of blade servers crosses any of the rack boundaries. All selections of blade servers are self-contained within respective racks 12. Blade server selection and rapid deployment tools take advantage of the integrated management infrastructure available within respective racks 12, but not across respective racks 12. However, the management server 14 receives and maintains information on all ASPs 20 in all racks 12, while dynamically provisioning ASPs 20 in multiple racks 12. Also, by the practice of various embodiments of the present invention adaptive controls operate across blade servers coupled to a network (e.g., LAN 16), and automate the task for adjusting the blade server capacity associated with a horizontally scalable service or application.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for automatically allocating computing resources of a rack-and-blade computer assembly comprising:

receiving server performance information from an application server pool disposed in a rack of a rack-and-blade computer assembly;

said application server pool comprising a blade server including an associated server agent for measuring performance of an application running on the blade server;

determining at least one QoS attribute for the application server pool;

determining that the QoS attribute is below a standard;

allocating a free blade server from a free server pool for use by the application server pool; and if the free server pool does not have an available blade server for allocation to the application server pool and based upon a request priority value of a resource request from the application, then allocating a different blade server from a second application server pool in the rack to and for use by the application server pool if the application server pool has a first application server pool priority that is higher than a second application server pool priority that is associated with the second application server pool, so that the application runs on resources of the application server pool and of the different blade server allocated to the application server pool, wherein the first application server pool, the second application server pool, and the free server pool are each disposed in said rack of said rack-and-blade computer assembly.

2. The method of claim 1 additionally comprising selecting, prior to allocating for use, a blade server from a free server pool to obtain a selected blade server.

3. The method of claim 2 additionally comprising preparing, prior to allocating for use, the selected blade server for operation with the application server pool.

4. The method of claim 1 additionally comprising reconfiguring a traffic management device associated with the application server pool.

5. The method of claim 2 additionally comprising reconfiguring a traffic management device associated with the application server pool.

6. The method of claim 3 additionally comprising reconfiguring a traffic management device associated with the application server pool.

7. A method for automatically allocating computing resources of a rack-and-blade computer assembly comprising:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is above a standard;
based upon a request priority value of a resource request from the application, removing the use of the blade server from the application server pool and allocating the blade server for use by a second application server pool in the rack if the application server pool has a first application server pool priority that is lower than a second application server pool priority that is associated with the second application server pool, so that the application runs on resources of the second application server pool and of the blade server allocated to the second application server pool, wherein the application server pool and the second application server pool are each disposed in said rack of said rack-and-blade computer assembly.

8. The method of claim 7 additionally comprising allocating the use of the removed blade server for use by a free server pool.

9. A method for automatically allocating computing resources of a rack-and-blade computer assembly comprising:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is below a standard;
determining that no blade server in a free server pool is available for use; and
based upon a request priority value of a resource request from the application, selecting a lower priority blade server in a second application server pool in the rack for use by the application server pool if the application server pool has a first application server pool priority that is higher than a second application server pool priority that is associated with the second application server pool, so that the application runs on resources of the application server pool and of the lower priority blade server allocated to the application server pool, wherein the application server pool, the second application server pool, and the free server pool are each disposed in said rack of said rack-and-blade computer assembly.

10. The method of claim 9 wherein said selecting a lower priority blade server comprises selecting a lower priority blade server from the application server pool to obtain a selected blade server.

11. The method of claim 10 additionally comprising preparing the selected blade server for operation with the application server pool.

12. The method of claim 11 additionally comprising flushing the selected blade server.

13. The method of claim 9 additionally comprising reconfiguring a traffic management device associated with the application server pool.

14. The method of claim 10 additionally comprising reconfiguring a traffic management device associated with the application server pool.

15. The method of claim 11 additionally comprising reconfiguring a traffic management device associated with the application server pool.

16. An application server pool produced in accordance with the method of claim 1.

17. An application server pool produced in accordance with the method of claim 7.

18. An application server pool produced in accordance with the method of claim 9.

19. A method for automatically allocating computing resources of a rack-and-blade computer assembly comprising:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is below a standard;
determining that a free server pool has a free blade server available for use;
selecting from the free server pool the available free blade server for use by the application server pool; and
if the free server pool does not have the available free blade server and based upon a request priority value of a resource request from the application, then selecting a different blade server from a second application server pool in the rack for use by the application server pool if the application server pool has a first application server pool priority that is higher than a second application server pool priority that is associated with the second application server pool, so that the application runs on resources of the application server pool and of the different blade server allocated to the application server pool, wherein the application server pool, the second application server pool, and the free server pool are each disposed in said rack of said rack-and-blade computer assembly.

20. The method of claim 19 additionally comprising installing software on the selected available blade server.

21. The method of claim 19 additionally comprising configuring the selected available blade server.

22. The method of claim 20 additionally comprising configuring the selected available blade server.

23. The method of claim 19 additionally comprising readying the selected available blade server for operation.

24. The method of claim 22 additionally comprising readying the selected available blade server for operation.

25. The method of claim 19 additionally comprising reconfiguring a traffic management device associated with the application server pool.

26. The method of claim 24 additionally comprising reconfiguring a traffic management device associated with the application server pool.

27. An application server pool produced in accordance with the method of claim 19.

28. An article of manufacture comprising:
a machine-readable, non-transitory medium having stored thereon instructions for:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is above a standard;
based upon a request priority value of a resource request from the application, removing the use of the blade server from the application server pool and allocating the blade server for use by a second application server pool in the rack if the application server pool has a first application server pool priority that is lower than a second application server pool priority that is associated with the second application server pool, so that the application runs on resources of the second application server pool and of the blade server allocated to the second application server pool, wherein the application server pool and the second application server pool are each disposed in said rack of said rack-and-blade computer assembly.

29. An article of manufacture comprising:
a machine-readable, non-transitory medium having stored thereon instructions for:
receiving server performance information from an application server pool disposed in a rack of a rack-and-blade computer assembly;
said application server pool comprising a blade server including an associated server agent for measuring performance of an application running on the blade server;
determining at least one Qos attribute for the application server pool;
determining that the QoS attribute is above a standard; and
based upon a request priority value of a resource request from the application, removing the use of the blade server from the application server pool and allocating the blade server for use by a second application server pool in the rack if the application server pool has a first application server pool priority that is lower than a second application server pool priority that is associated with the second application server pool, so that the application runs on resources of the second application server pool and of the blade server allocated to the second application server pool.

30. An article of manufacture comprising:
a machine-readable, non-transitory medium having stored thereon instructions for:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is below a standard;
determining that no blade servers in a free server pool is available for use; and
based upon a request priority value of a resource request from the application, selecting for use by the application server pool a lower priority blade server in a second application server pool in the rack if the application server pool has a first application server pool priority that is higher than a second application server pool priority that is associated with the second application server pool, so that the application runs on resources of the application server pool and of the lower priority blade server allocated to the application server pool, wherein the application server pool, the second application server pool, and the free server pool are each disposed in said rack of said rack-and-blade computer assembly.

31. An article of manufacture comprising:
a machine-readable, non-transitory medium having stored thereon instructions for:
receiving server performance information from an application server pool disposed in a rack of a rack-and-blade computer assembly;
said application server pool comprising a blade server including an associated server agent for measuring performance of an application running on the blade server;
determining at least one QoS attribute for the application server pool;
determining that the QoS attribute is below a standard;
determining that a free server pool has a free blade server available for use;
selecting from the free server pool the available free blade server for use by the application server pool; and
if the free server pool does not have the available blade server and based upon a request priority value of a resource request from the application, then selecting a different blade server from a second application server pool in the rack for use by the application server pool if the application server pool has a first application server pool priority that is higher than a second application server pool priority that is associated with the second application server pool, so that the application runs on resources of the application server pool and of the different blade server allocated to the application server pool, wherein the application server pool, the second application server pool, and the free server pool are each disposed in said rack of said rack-and-blade computer assembly.

32. The method of claim 1 additionally comprising provisioning images onto at least one blade server of the application server pool.

33. The method of claim 7 additionally comprising provisioning images onto at least one blade server of the application server pool.

34. The method of claim 9 additionally comprising provisioning images onto at least one blade server of the application server pool.

35. The method of claim 19 additionally comprising provisioning images onto at least one blade server of the application server pool.

36. The method of claim 1 additionally comprising monitoring the performance of at least one blade server of the application server pool from information received by a server agent associated with the blade server.

37. The method of claim 7 additionally comprising monitoring the performance of at least one blade server of the application server pool from information received by a server agent associated with the blade server.

38. The method of claim 9 additionally comprising monitoring the performance of at least one blade server of the application server pool from information received by a server agent associated with the blade server.

39. The method of claim 19 additionally comprising monitoring the performance of at least one blade server of the application server pool from information received by a server agent associated with the blade server.

40. The method of claim 1 additionally comprising removing the use of at least one blade server from the application server pool.

41. The method of claim 9 additionally comprising removing the use of at least one blade server from the application server pool.

42. The method of claim 19 additionally comprising removing the use of at least one blade server from the application server pool.

43. The method of claim 40 additionally comprising disposing the removed blade server in the free server pool.

44. The method of claim 41 additionally comprising disposing the removed blade server in the free server pool.

45. The method of claim 42 additionally comprising disposing the removed blade server in the free server pool.

46. The method of claim 1 transmitting alarms asynchronously to a management server.

47. The method of claim 7 transmitting alarms asynchronously to a management server.

48. The method of claim 9 transmitting alarms asynchronously to a management server.

49. The method of claim 19 transmitting alarms asynchronously to a management server.

50. The method of claim 1 additionally comprising determining a relative performance of another application server pool.

51. The method of claim 9 additionally comprising determining a relative performance of another application server pool.

52. The method of claim 19 additionally comprising determining a relative performance of another application server pool.

53. The method of claim 50 additionally comprising identifying at least one blade server from said another application server pool that would impact performance the least if reallocated to the application server pool.

54. The method of claim 51 additionally comprising identifying at least one blade server from said another application server pool that would impact performance the least if reallocated to the application server pool.

55. The method of claim 52 additionally comprising identifying at least one blade server from said another application server pool that would impact performance the least if reallocated to the application server pool.

* * * * *